US00RE34068E

United States Patent [19]

Mortvedt et al.

[11] E Patent Number: Re. 34,068

[45] Reissued Date of Patent: Sep. 15, 1992

[54] RACQUETBALL RAQUET WITH INCREASED HITTING AREA

[75] Inventors: Raymond L. Mortvedt, Santee; Steven M. Thompson, San Diego, both of Calif.

[73] Assignee: Ektelon, San Diego, Calif.

[21] Appl. No.: 550,220

[22] Filed: Jul. 9, 1990

Related U.S. Patent Documents

Reissue of:

[64] Patent No.: 4,618,148
Issued: Oct. 21, 1986
Appl. No.: 760,337
Filed: Jul. 29, 1985

U.S. Applications:

[63] Continuation of Ser. No. 291,248, Dec. 28, 1988, abandoned, which is a continuation of Ser. No. 560,538, Dec. 12, 1983, Pat. No. 4,531,738.

[51] Int. Cl.[5] ..... A63B 49/12

[52] U.S. Cl. ..... 273/73 C

[58] Field of Search ..... 273/73 R, 73 C, 73 D, 273/73 F, 73 G, 73 H

[56] References Cited

U.S. PATENT DOCUMENTS

| | | | |
|---|---|---|---|
| D. 260,415 | 8/1981 | Erwin | D21/212 |
| 1,539,019 | 5/1925 | Nikonow . | |
| 3,787,051 | 1/1974 | Johns | 273/73 F |
| 3,999,756 | 12/1976 | Head | 273/73 C |
| 4,151,995 | 5/1979 | Weed | 273/73 C |
| 4,196,901 | 4/1980 | Durbin | 273/73 G |
| 4,265,450 | 5/1981 | Drake et al. | 273/73 G |
| 4,275,885 | 6/1981 | Howe | 273/73 C |
| 4,280,699 | 7/1981 | Drake | 273/73 C |
| 4,310,157 | 1/1982 | Greenberg | 273/73 C |
| 4,360,201 | 11/1982 | Biehl et al. | 273/73 C |
| 4,531,738 | 7/1985 | Mortvedt et al. | 273/73 C |

FOREIGN PATENT DOCUMENTS 1207840 10/1970 United Kingdom ..... 273/DIG. 7

OTHER PUBLICATIONS

The Sporting Goods Dealer, "A Racquetball Primer," 1978, pp. 62, 64.

World Tennis, "Racquet Review," Aug. 1984, pp. 57-59.

S. Fiott, "Tennis Equipment," 1978, p. 66.

R. Pangrazi, "Racquetball," 1987, pp. 103-105 (AARA Rules).

*Primary Examiner*—Benjamin Layno
*Assistant Examiner*—William Stoll
*Attorney, Agent, or Firm*—Oldham, Oldham & Wilson Co.

[57] ABSTRACT

The improved racquet has a strung surface which is larger in area than the strung surface of a conventional racquet, and in which the strung area is both longer in length and width than the strung area of a conventional racquet. However, the overall weight and balance of a conventional racquetball racquet which have proven necessary for good playing characteristics for all such racquets have been maintained. The racquet has synergistically combined the weight of the racquet, the center of mass of the racquet, the stiffness of the frame, and the response characteristics to create a racquet of sufficient durability with a larger "sweet spot" to facilitate the playing of the sport and to increase the level of skill, particularly of the novice and intermediate players. The racquet has an overall length of [18½] *19* inches to 22½ inches and a width of 9½ inches to 11½ inches, a weight of 220 grams to 270 grams, and a center of gravity at a location within a range of ¾ inch toward the handle and ½ inch toward the head as measured from the longitudinal center point of the racquet.

5 Claims, 3 Drawing Sheets

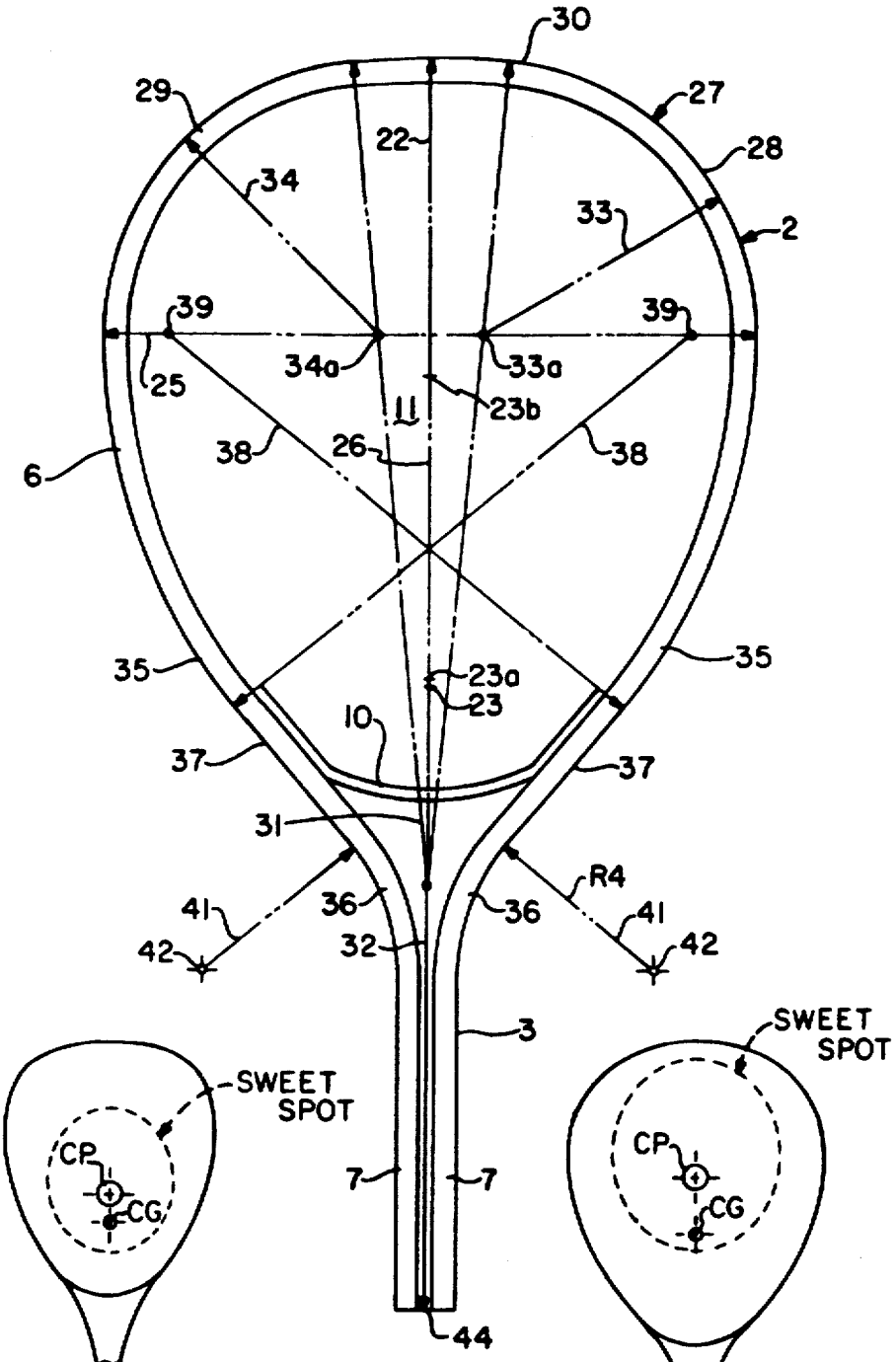
FIG. 4
FIG. 5 CONVENTIONAL
FIG. 6

RACQUETBALL RAQUET WITH INCREASED HITTING AREA

Matter enclosed in heavy brackets [ ] appears in the original patent but forms no part of this reissue specification; matter printed in italics indicates the additions made by reissue.[

CROSS-REFERENCE]

This *is a continuation of application Ser. No. 07/291,248 filed on Dec. 28, 1988, now abandoned, which* is a *reissue of application Ser. No. 07/760,337, filed Jul. 29, 1985, now U.S. Pat. No. 4,618,148, which is a* continuation [application] of application Ser. No. 560,538, filed Dec. 12, 1983 now U.S. Pat. No. 4,531,738.

TECHNICAL FIELD

The invention relates to racquetball racquets and particularly to a racquet having a larger size ball striking surface than conventional racquets, and in which the overall length, weight and balance of the conventional racquetball racquets are maintained.

BACKGROUND ART

The sport of racquetball has increased considerably over the past several years due to its appeal to both male and female participants, and since it is played primarily indoors enabling it to be played year round, relatively unaffected by the weather. Also, the sport provides excellent physical exercise, yet does not require a considerable amount of time and skill to achieve a satisfactory level of play in contrast to tennis, golf and handball which require a considerably greater amount of time and practice to acquire the same satisfying level of skill. Furthermore, racquetball is relatively inexpensive to play in comparison to golf since the required equipment is gym clothes, a racquet and ball.

It has been found that the sooner a novice player reaches a satisfactory level of play, greater is the likelihood that the player will continue playing the game. It is believed that a racquetball racquet having an enlarged ball striking surface constructed in accordance with our invention, which is described in greater detail below, will improve more quickly the level of play of beginning players, in addition to improving the play of the more experienced players resulting in greater enjoyment to the player. This results in more players continuing to play racquetball thereby achieving the effects of physical activity and competition throughout their life.

Various types of racquetball racquets are presently in use today and are produced by a number of manufacturers. These racquets consist of a frame formed of aluminum, steel, wood, graphite or various compositions thereof with interwoven strings of nylon and occasionally of animal gut which form the ball striking surface. However, all of these prior racquets are of a standard frame size and have the same size ball striking string area. Likewise, the weight of the racquet is generally the same with only a relatively small variance. The conventional racquetball racquet used today has an overall length of about 18½ inches with a width of about 8 inches and has a string area of approximately 60 square inches. Although an oversized racquet of the type covered by my invention would not be approved under current American Amateur Racquet Association (AARA) rules, wherein the combined length plus width shall not exceed 27 inches, it would find great acceptance by the novice and average racquetball players with anticipation that the larger size racquet will subsequently be approved and be permitted for tournament play.

The use of oversized or enlarged tennis racquets in comparison to the heretofore recognized standard size tennis racquet, has achieved considerable success. Some examples of these enlarged tennis racquets are shown in U.S. Pat. Nos. 3,999,756; 4,151,995; 4,275,885 and 4,310,157. Although oversized tennis racquets have been used in tennis for the past several years, the requirements of a racquetball racquet are different from that of the requirements of a tennis racquet, due to the differences in the two games and the playing thereof.

Racquetball differs in numerous aspects from tennis, thereby presenting a considerable number of different criteria to be considered in the design of a racquetball racquet. The size and configuration of a tennis court is completely different from that of racquetball as well as the nature of winning a point. In tennis, the object is to hit the ball to a particular position on the court making it difficult for the opponent to reach it due to the speed and direction of the ball. Whereas in racquetball, the other player cannot normally be passed by the ball in that the ball will normally return to a position on the court where it can be hit by the opposing player due to the ball rebounding off of the floor walls and/or ceiling. This requires a player to hit a shot that will bounce more than once, on the floor, before the opposing player can reach it.

In racquetball, the racquet should be designed enabling it to get as close as possible to the walls and into the tight fit of the corners in order to hit the ball and return the opposer's shot. In tennis, there are no walls or corners with which to be concerned. Also, the technique of hitting the ball is completely different in tennis than in racquetball. In tennis, a stiff wrist is desired and the ball is either hit with a top spin or undercut to impart reverse spin to the ball. In racquetball, the wrist is loose and the ball is hit with a snapping action or stroke. In tennis, the ball is normally hit in the lower two-thirds of the string area whereas in racquetball the ball is normally hit in the upper one-third of the string area. This requires a static balance or center of gravity requirement different from that of a tennis racquet. For example, the center of gravity of one of the most popular oversized tennis racquets described in U.S. Pat. No. 3,999,756 may vary within a range of from 45 to 52 percent with respect to the center point of the racquet. More specifically, the center of gravity of this particular tennis racquet may range from 1.35 inches toward the handle providing a "head light" racquet to 0.54 inches toward the head of the frame providing a "head heavy" type of racquet. Whereas in the oversized racquetball racquet of our invention, the location of the center of gravity must trend opposite from that of an oversized tennis racquet in order to achieve the most satisfactory result and racquet performance.

Also, strength or durability of a tennis and racquetball racquet are different in that the ball velocity is substantially greater in racquetball than in tennis. In tennis, the ball impacts and court surface abrasion are major design factors, whereas in racquetball, the ball impacts plus floor or wall impacts require a very different structural concept.

All of these differences between the games of tennis and racquetball and between the oversized tennis racquet and the oversized racquetball racquet of our invention resulted in a completely different set of criteria and features that had to be resolved in arriving at the improved racquetball racquet construction of our invention.

DISCLOSURE OF INVENTION

Objectives of the invention include providing an improved racquetball racquet construction having a frame consisting of a head connected to *a* handle grip with an overall length of between 18½ inches to 22½ inches with the preferred length being 20½ inches, and with a *frame and strung surface* width between 9½ inches and 11½ inches with the preferred width being 10½ inches, and having a weight in the range of 220 grams to 270 grams. A further objective is to provide such a racquet in which the head of the racquet has a generally oval or rectangular shape with a strung surface, defined by the inner periphery of the frame, having an area of approximately 90 square inches with a range of 75 to 100 square inches; and in which the length of the string area is preferably 40 percent greater than the width of the string area.

Another objective of the invention is to provide such a racquetball racquet having a string area approximately 50 percent greater in size than that of the conventional racquetball racquet string area, with the length of the string portion in substantial alignment with the handle being approximately 12 inches if a throat is used at the lower end of the string area, and approximately 14¾ inches if no connecting throat is employed on the racquet frame.

A further objective of the invention is to provide such a racquet in which the center of gravity is located on the longitudinal center line on the racquet, *and* is at a location within a range of ¾ of an inch toward the handle and ½ of an inch toward the head as measured from the longitudinal center point of the racquet. Another objective is to provide such a racquet in which the head has a generally oval or oblong shape with a slightly flattened outer end in which major and minor axes intersect at a location on the longitudinal center line of the racquet spaced above the center point of the string area; in which the outer frame defines the arc which subtends the cord that is defined by the minor axis and in which this frame arc is composed of three arcuate sections having three separate center points with the center point of the center arcuate section lying on the longitudinal center line of the racquet and being almost three times greater than the radii of the other two arcuate sections, the center points of which lie generally on the minor axis, each on an opposite side of the longitudinal center line of the racquet, and in which the arcuate length of the center arcuate section is approximately 10 degrees with the arcuate length of each of the other two arcuate sections being approximately 85 degrees which provide a racquet having a relatively flat head enabling the racquet to have a greater string area closer to the court walls and into the corners thereof for better return of the ball in those heretofore difficult shot areas, and to provide larger string area in the upper third of the racquet where balls are most often hit. Additionally, the longer length gives the player more reach.

These objectives and advantages are obtained by the improved racquetball racquet construction, the general nature of which may be stated as including a frame having a head connected to a handle grip so as to have an overall length of 18½ to 22½ inches and a weight of 220 grams of 270 grams, said head having a strung surface of 75 to 100 square inches, the length of said strung surface in a direction along the longitudinal axis of the racquet being between 12 and 14¾ inches and between 53 and 68 percent of the total length of the racquet, said frame and strung surface having a maximum width between 9½ and 11½ inches in a direction generally perpendicular to said longitudinal axis, the center of gravity of the racquet being at a location within a range of ¾ inch toward the hand and ½ inch toward the head as measured from the longitudinal center point of the racquet.

BRIEF DESCRIPTION OF THE DRAWINGS

FIG. 4 is an enlarged elevational view similar to FIG. 1 with the racquet strings removed and with the various frame portion radii being illustrated together with the center of percussion and center of gravity being illustrated thereon;

FIG. 5 is an elevational view which illustrates a conventional racquet frame[, stringing pattern,] and [average] center of gravity and center of percussion;

FIG. 6 is an elevational view which illustrates the oversized racquet of the invention[, its stringing pattern,] and [average] center of gravity and center of percussion;

Similar numerals refer to similar parts throughout the drawings.

BEST MODE FOR CARRYING OUT THE INVENTION

Figure 3:
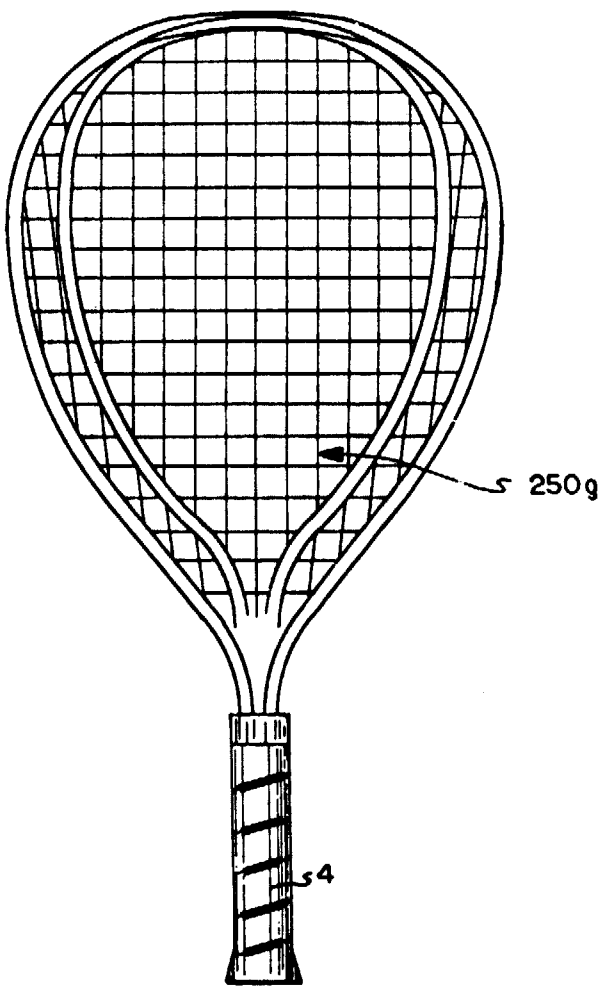
FIG. 3 is a diagrammatic comparison of the racquet of the present invention contrasted with a conventional racquet to illustrate the comparative sizes therebetween.
Figure 2:
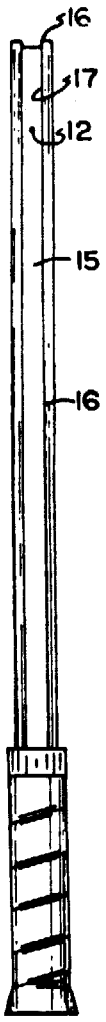
FIG. 2 is a side elevational view of the racquet shown in FIG. 1.
Figure 1:
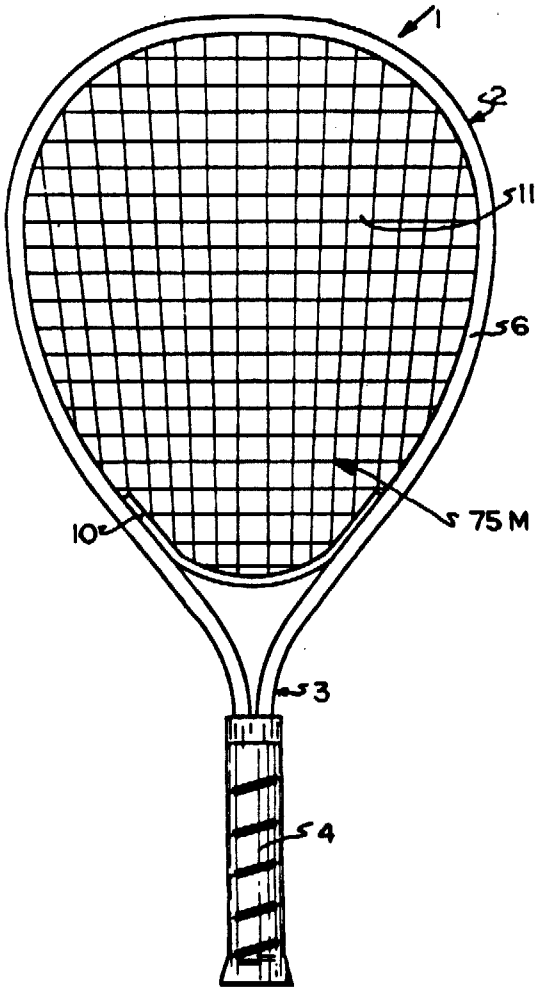
FIG. 1 is a plan view of the improved racquetball racquet construction of the invention.

The improved racquetball racquet is indicated generally at 1, and is shown particularly in FIGS. 1 and 2. Racquet 1 includes a head and a handle shaft indicated generally at 2 and 3 respectively. The handle shaft is wrapped with leather or similar material to form a hand grip 4.

Racquet 1 includes a frame 6 preferably made of high strength aluminum alloy, although the same could be made of wood, graphite, fiberglass or various compositions thereof. Frame 6 is bent into the desired configuration forming head 2 which has a general oblong or oval configuration with parallel ends 7 (FIG. 4) which form the support for hand grip 4 secured about frame ends 7. Hand grip 4 may be in various sizes to match the size of the player's hand enabling the player to get a proper "feel" of the racquet.

A throat 10 may be secured within frame 6 to form the lower completion of the oval-shaped portion of frame 6 which defines the strung area 11. Throat 10, as well as frame 6, are formed with a plurality of holes, *one of which is illustrated at* 12, for receiving strings 13 therethrough, which form the pattern for strung area 11. A plastic grommet strip 15 preferably extends around the outer edge 16 of frame 6 to reduce the abrasive action of strings [11] *13* against frame 6 when repeatedly struck by a ball to increase the life of the strings. Grommet strip 15 is mounted in a channel 17 formed by frame edges 16 (FIG. 2). Strings 13 are of a usual construction, preferably formed of nylon or other synthetic or composite material although animal gut could be used if desired.

The number of strings 13 which form strung area 11 consists of a plurality of longitudinally extending strings 19 and a plurality of transversely extending strings 20 interwoven with strings 19 in a usual manner. The number of strings 19 and 20 may vary depending upon the final size of the racquet. In the preferred racquet shown in the drawings, strung area 11 consists of longitudinal strings 19 and transversely extending strings 20.

In accordance with one of the features of the invention, improved racquet 1 will have a strung area considerably larger than that of a conventional racquetball racquet. The overall length of racquet 1 will be between 18½ and 22½ inches, preferably 20½ inches (a conventional racquet being 18 to 19 inches). Furthermore, the weight of the racquet will be between 220 grams and 270 grams. Preferably the improved racquet will weigh between 240 and 250 grams which again is the conventional weight range of a usual racquetball racquet. By maintaining the same overall balance and weight of the conventional racquetball racquet, a player will not have to become accustomed to a completely different feel of the racquet, yet will achieve the greater results of the increased ball striking area provided by strung area 11.

The following data should be noted:

A. Radar gun tests, using accomplished players show consistently 10 percent higher ball velocities than conventional racquets for the following reasons: (1) The center of percussion is approximately 1.4 inches (10 percent) closer to the impact point (see FIGS. 5 and 6); (2) Longitudinal moment of inertia is approximately 30 percent higher (50 to 90 g in $sec^2$ vs. 35 to 70); and (3) main and cross strings, in the impact zone, are 30 to 40 percent longer (13 inches and 9.5 inches vs. 9.5 inches and 7.1 inches).

B. Players feel that off-center [mishit] *mis-hit* or reaction shots get to the front wall with more authority for the same reasons as noted in (A) immediately above, plus (1) rotational moment of inertia is 100 percent higher than conventional frames (4.8 g in $sec^2$ vs. 2.4); and (2) the "sweet spot" area is over 30 percent greater. See "sweet spot" comparisons in FIGS. 5 and 6.

C. Players get better court coverage and more reach because the racquet is over 10 percent longer and nearly 40 percent wider than conventional frames.

The width of racquet 1 or the outside distance between the frame edges of head 2 is between 9½ inches and 11½ inches in the direction perpendicular to the longitudinal axis of the racquet which is indicated at 22 in FIG. 4. The preferable width is 10½ inches.

The center of gravity *23a* of racquet 1 is at a location within a range of ¾ of an inch toward hand and grip 4 and ½ inch toward the racquet head as measured from the longitudinal center point of the racquet indicated at 23 in FIG. 4. *In the preferred racquet shown in FIG. 4, the center of gravity 23a is approximately 10.3 inches from the bottom of the handle grip 44, or approximately 0.05 inch above the longitudinal center point 23.*

In accordance with another feature of the invention, improved racquetball racquet 1 has a generally flattened outer end for head 2, to enable the larger string area to get closer to the court walls and into the corners for hitting the ball in these heretofore tight areas. Head 2 which has the generally oval oblong configuration, has a minor axis 25 (FIG. 4) which intersects major axis 26 which lies on the longitudinal axis 22 of the racquet. The arc 27 which is subtended by minor axis 25 consists of three arcuate sections, comprised of two outer sections 28 and 29 and a center section 30. Center section 30 has an arcuate length of approximately 10 degrees and is defined by a radius line indicated at 31, the center point of which is indicated at 32.

The arcuate lengths of outer sections 28 and 29 are approximately 85 degrees each and are defined by radii lines indicated at 33 and 34, respectively, the center points 33a and 34a of which lie on opposite sides of longitudinal axis 22 generally on minor axis 25. This arrangement provides for the flattened head configuration due to the extremely large radius of center arcuate section 30, whose radius 31 preferably is about three times greater than that of outer arcuate section radii 33 and 34. In the preferred embodiment, radius 31 is approximately 12 inches with radii 33 and 34 being approximately 4½ inches each.

The lower portion of racquet head 2 located between minor axis 25 and frame [handles] *handle ends* 7, is symmetrical and is composed of two symmetrical sections, each of which includes a convexly curved section 35 which is connected to a concavely curved section 36 by a straight section 37. Concave section 36 terminates into parallel handle ends 7. The radii for convex sections 35 are indicated at 38 with their center points 39 being located generally on minor axis 25 on opposite sides of longitudinal center lines 22. The radii for concave sections 36 are indicated at 41 with their center points 42 being located on opposite sides of handle ends 7.

In order to produce an acceptable racquet, a number of parameters had to be considered in developing improved enlarged racquetball racquet 1. The various parameters all work together to produce the desired racquet effect. These various parameters synergistically combined to create a racquet suitable for the marketplace. These parameters includes the weight of the racquet, the center of mass or gravity of the racquet, the stiffness of the frame and the response characteristics. All of these work together to create racquet control. If you change one of the parameters, it would change the feel of the racquet and effect the way the ball comes off of the string area. Therefore, in developing improved racquet 1, considerably more was involved than merely increasing the size of the strung area to give the player more racquet face and a larger "sweet spot" in which to hit the ball. Unless the various factors were compensated for, the enlarged racquet may have resulted in a completely unsuitable and unsatisfactory racquet for play.

One of these important features is that the center of gravity had to fall within a relatively tight range as described above. This, in combination with the weight of the racquet and the overall length, provides the necessary relationship between these parameters to achieve a satisfactory oversized or enlarged racquet. For example, just making the racquet head larger would increase the weight of the racquet to an unacceptable limit unless the racquethead was sized and configured to provide the desired strength without an increase in weight. Furthermore, the tension of the strings could more easily deform an enlarged racquet head unless the head and frame thereof provided sufficient stiffness to such deformation. Therefore, it was determined that in the preferred size, the length of the racquet is 40 percent greater than its width, although it could fall within the range of between 20 and 60 percent without materially affecting the concept of the invention, although the 40 percent value is believed to provide more satisfactory results.

Minimum frame stiffness is as follows:

$$(EI)_{xx} \geqq 30{,}000\ \#in^2,\ (EI)_{yy} \geqq 7{,}000\ \#in^2,\ GJ \geqq 700\ \#in^2,\ AE \geqq 0.8 \times 10^6\ \#in^2$$

Figure 7:
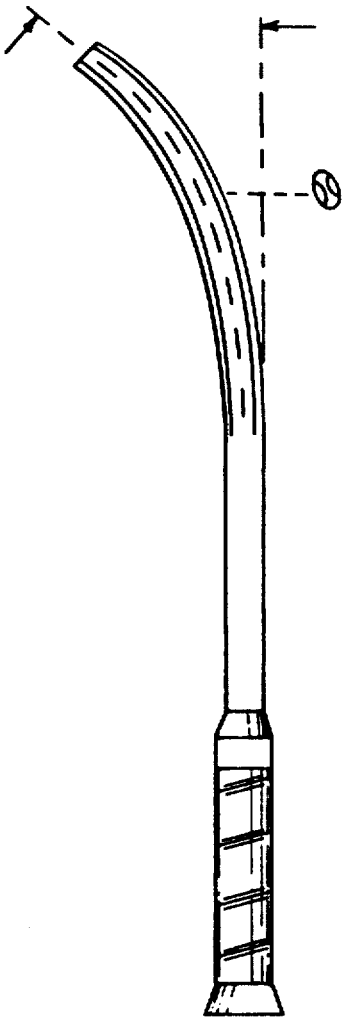
FIG. 7 is an illustration showing longitudinal bending [stiffness $(EI)_{xx}$] *of the racquet;*

$(EI)_{xx}$ is the longitudinal bending stiffness. The more stiffness, the less energy is wasted in bending the shaft, and hence it contributes to power. This is shown in FIG. 7.

Figure 8:
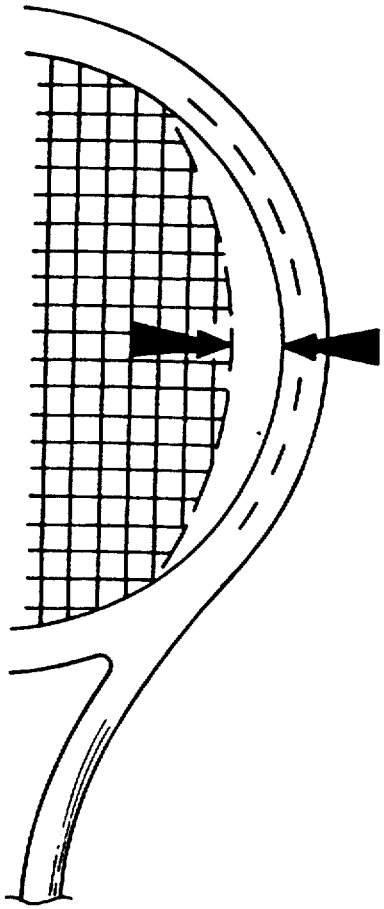
FIG. 8 is an illustration showing lateral bending [stiffness $(EI)_{yy}$] *of the racquet;*

$(EI)_{yy}$ is the lateral bending stiffness. It reduces distortion of head geometry at impact, and contributes to power and control by providing an even string response across the racquet face. This is shown in FIG. 8.

Figure 9:
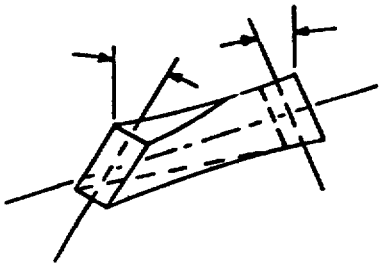
FIG. 9 is an illustration showing [torsional stiffness (GJ)] *an element of the frame undergoing torsion*.

(GJ) is the torsional stiffness. It helps eliminate twist and distortion of the frame, and contributes to power and control by providing stability on offcenter hits. It is shown in FIG. 9.

Figure 10:
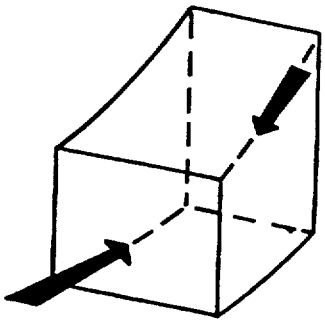
FIG. 10 is an illustration showing [axial stiffness (AE)] *an element of the frame undergoing axial compression.*

(AE) is axial stiffness or resistance to compression. The more axial stiffness, the less energy dissipated by the head at impact. It contributes to power. It is shown in FIG. 10.

The racquet will be about the same weight as a conventional racquet.

Furthermore, in racquetball the ball is hit in the top one third portion of the string area as opposed to tennis where it is normally hit in the lower two thirds portion of the string area. The particular shape of the enlarged racquet provides a greater amount of strings in the upper one third portion of the racquet head in order to provide a greater string area where the majority of the actual hitting of the ball is accomplished. Also, the enlarged string area and correspondingly the larger "sweet spot" enables the player to hit this desired area more often which will eliminate some of the vibration and stress on the player's arm which occurs when the ball is hit off center or out of the "sweet spot" area.

Another advantage of the improved racquetball racquet is that the center of percussion is moved towards the tip of the racquet more than 1¼ inches as compared to the conventional racquet without affecting the overall weight and balance of the racquet providing a better "sweet spot". [The] *A* center of percussion is [the] *a* point measured from a reference line or rotation line at which the entire mass of the frame is assumed to act[ The] *during rotation. With respect to racquets, the* reference line is usually somewhere on the handle[, which is described as the functional end of the handle designated $END_F$ in FIGS. 5 and 6]. *As is well known in the art, the distance from the reference line to the center of percussion may be determined by dividing the moment of inertia by the product of the mass of the racquet and the distance from the reference line to the static center of gravity.* The moment of inertia about the center of percussion depends upon the mass of the racquet and the center of gravity in that mass. Depending upon how that mass is distributed, it has an effect on the static center of gravity and a varying effect on the center of percussion. *In comparing FIGS. 5 and 6, one can ascertain that the movement of the sweet spot upwards translates into a spacing from the center of gravity of more than 3.6 inches towards the frame tip. This is derived from the fact that in conventional racquetball racquets, the center of percussion is located approximately 13.9 inches from the butt end of the handle (FIG. 5). In the racquet of the instant invention (FIG. 6), the center of gravity is located at a distance 10.3 inches from the butt end of the handle. Thus, assuming no upward movement of the center of percussion, the center of percussion of the novel racquet (FIG. 6) would be located at a distance of 3.6 inches from the center of gravity (13.9—10.3). Since the center of percussion has been moved upwards though, its location can be described as being spaced from the center of gravity by a distance greater than 3.6 inches.*

The percentage of the string area above and below the minor axis, thus showing the larger string area in the normal hitting area of the oversized racquetball racquet versus the smaller string area towards the throat piece or the handle is shown in the table below.

| | Area Above/Below Mid Point of Center Mainstrings | |
|---|---|---|
| | $in^2$ | Percent |
| Oversized Racquet | 57.5/34.0 | 62.9/37.1 |
| Conventional Racquet | 32.1/27.7 | 53.7/46.3 |

While in accordance with the patent statutes, only the best mode and preferred embodiment of the invention has been illustrated and described in detail, it is to be understood that for the true scope and breadth of the invention, reference should be had to the appended claims.

What is claimed is:

1. A racquetball racquet comprising a frame having a head connected to a handle grip so as to have an overall length of 19 to 22½ inches and a weight of 220 grams to 270 grams, said head having a strung surface of 75 to 100 square inches, the length of said strung surface in a direction along the longitudinal axis of the racquet being between 12 and 14¾ inches and between 53 and 68 percent of the length of the racquet, the sum total of the length of said frame plus the width of said strung surface being substantially greater than 27 inches, the center of gravity of the racquet being at a location within a range of ¾ inch toward the handle grip and ½ inch toward the head as measured from the longitudinal center point of the racquet, and the center of percussion [average] is spaced from the center of gravity toward the head a distance substantially greater than 3.6 inches.

2. The racquetball racquet defined in claim 1 in which the head has a generally oblong shape with a lightly flattened outer end; and in which major and minor axes intersect at a location on the longitudinal center line of the racquet spaced above the center point of the strung area.

3. A racquetball racquet as defined in claim 1 in which the center of gravity is at a location within a range of ¼ inch toward the handle and ½ inch toward the head of the racquet as measured from the longitudinal center point of the racquet.

4. The racquetball racquet defined in claim 1 in which the strung surface is strung with strings at a tension of between 30 and 45 pounds.

5. The racquetball racquet defined in claim 1 in which the length of the strung surface is within the range of 20 and 60 percent greater than the width of the strung area.

* * * * *